Sept. 23, 1969  C. R. REED ET AL  3,469,083
ANALOG CALCULATOR FOR DETERMINING PERCENTAGE CALCULATIONS
BASED ON CONSTITUENT MEASUREMENTS
Filed Nov. 17, 1965  2 Sheets-Sheet 1
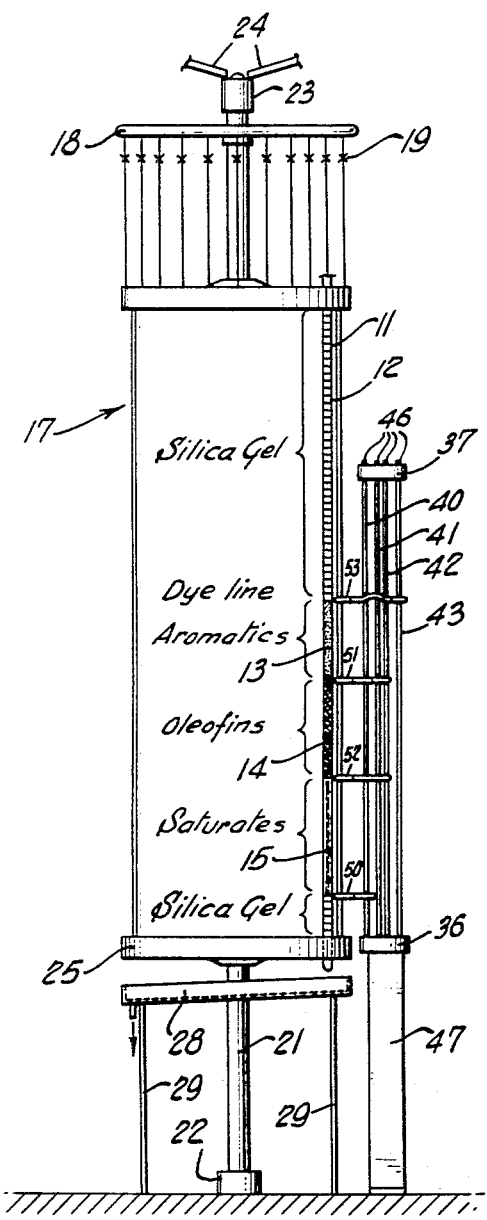
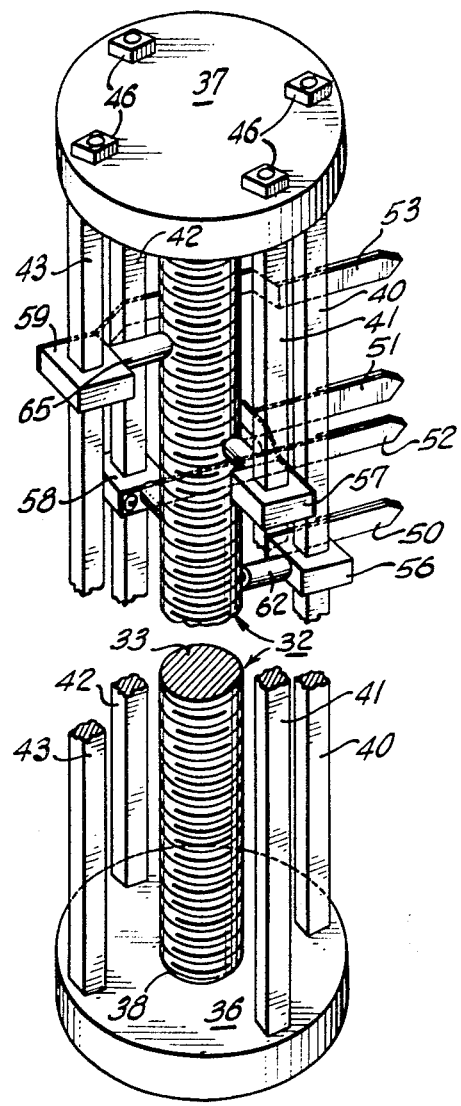

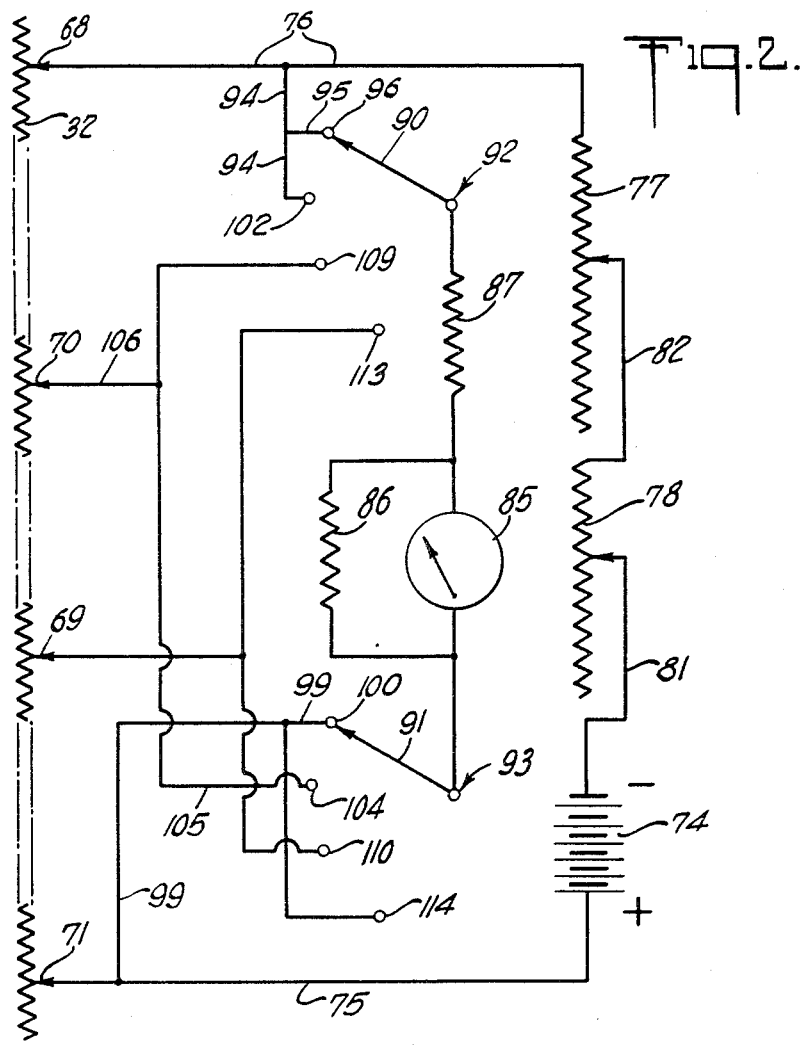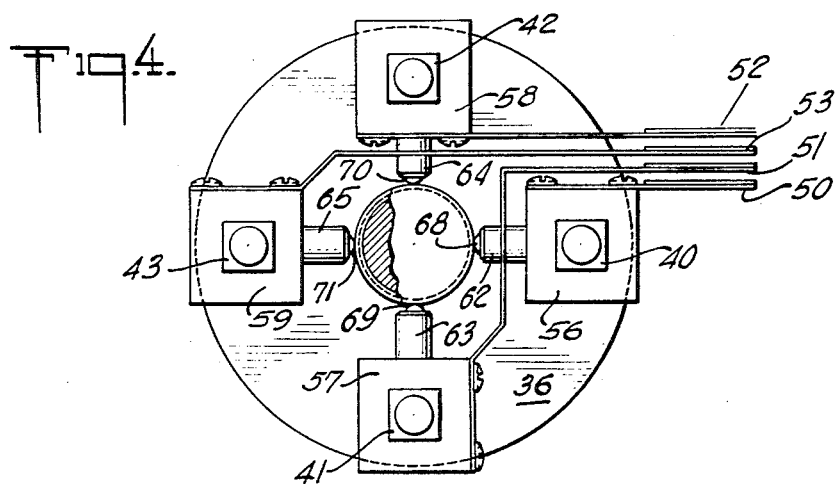

United States Patent Office 3,469,083
Patented Sept. 23, 1969

3,469,083
ANALOG CALCULATOR FOR DETERMINING PERCENTAGE CALCULATIONS BASED ON CONSTITUENT MEASUREMENTS
Claude R. Reed, Fishkill, and John W. Eldridge, Jr., New Windsor, N.Y., and Raymond Lanari, deceased, late of Beacon, N.Y., by Susan M. Lanari, executrix, Beacon, N.Y., assignors to Texaco Inc., New York, N.Y., a corporation of Delaware
Filed Nov. 17, 1965, Ser. No. 508,399
Int. Cl. G06f 15/20; G06g 7/48
U.S. Cl. 235—151.35                                    7 Claims

ABSTRACT OF THE DISCLOSURE

A linear resistor constructed so as to be physically related to a linearly measurable quantity that is divided into constituent portions. The length of such resistor is greater than the maximum total quantity. There are independently variable taps to correspond with the ends of the total quantity and with the junctions of the constituent portions. An electrical circuit permits measuring the resistance between the end taps and setting this measurement at a given magnitude representing one hundred percent. Then, by switching the measurement to pairs of taps at the extremities of constituent portions, the constituent portion magnitudes are determined directly in percentage of the total quantity.

---

This invention concerns an analog type calculator, in general, and more specifically relates to an electrical analog calculator. It is for use where relatively simple type arithmetic calculations are repeated a number of times from linear measurements. A specific application concerns percentage calculations based on constituent measurements, that may vary along with but independently from the total measurement.

The invention is particularly applicable to calculations that are made in connection with a so-called fluorescent indicator adsorption test, that is in turn related to liquid petroleum products. In such a test, measurements are made to determine the percentage of aromatics, olefins, and saturates in a liquid petroleum product. The test involves a long vertical column that contains silica gel. Into such column the petroleum product is introduced, in connection with fluorescent dyes, and in such manner as to create separate zones with recognizable borders making up the various components of the product. Such a test procedure is fully described in the American Society for Testing and Materials Publication entitled "ASTM Standards on Petroleum Products and Lubricants (With Related Information)," vol. I, 39th edition, 1962, commencing at p. 718 and relating to a test designated D1319-61-T. In that method the measurements for determining percentage of the constituents of the liquid hydrocarbon are described using manually determined measurements followed by arithmetic calculations in order to determine the results.

By employing a calculator according to this invention the measurements for any particular reading in connection with the foregoing standard method of carrying out a test, may be accomplished rapidly and without any arithmetic calculations needed to determine the percentage for each of the constituents. For this reason, and particularly where a substantial number of tests of this type are to be carried out each day, the saving in man hours of routine work is very substantial.

Heretofore electrical type analog computers have been employed in various and sometimes highly sophisticated systems, for complex calculations. However, prior to this invention there has been nothing for making a simple yet direct-reading calculation that indicates from a linear measurement the percentage of a predetermined total linear distance, where both the linear measurement and the total distance may vary.

Consequently, it is an object of this invention to provide a system applicable to a situation wherein a total linear distance may be laid out followed by a marking off of a plurality of portions thereof. The system being arranged for electrically providing a direct reading in percentage of the total measurement of each of the plurality of portions, as marked out.

Another object of the invention is to provide an electrical analog type calculator, that is particularly adapted for use in connection with measuring the constituents of a liquid petroleum column. The constituents being determined in accordance with a standard test method.

Briefly, the invention concerns an analog calculator for directly reading partial linear measurements as a percentage of a predetermined total linear distance. The calculator comprises, in combination, a linear resistor having an effective length proportional to at least said predetermined total distance; and a plurality of variable taps including extreme end taps for making electrical connections with said linear resistor. The combination also comprises means for connecting said taps at points along said resistor spaced proportionally to said linear measurements, and means for measuring the resistance between predetermined pairs of said taps as a percentage of the resistance between the extreme end taps.

Again briefly, the invention concerns an analog calculator for directly reading partial linear measurements as a percentage of a predetermined total linear distance. The calculator comprises in combination a linear resistor having an effective length proportional to at least said predetermined total distance. The combination also comprises a plurality of variable taps for making electrical connections with said linear resistor, and means for connecting said taps at relatively spaced points along said resistor which spacing is proportional to said linear measurements. The combination also comprises a source of electromotive force, a volt meter, and a switch for alternatively connecting the volt meter between the said extreme end taps or adjacent pairs of said taps from one end to the other. By means of the total combination, the said volt meter may be adjusted to read one hundred percent between the extreme end taps and thereafter will read directly in terms of percentage, as it is connected to adjacent pairs of the variable taps.

Once more briefly, the invention concerns an analog calculator like that indicated above, but one that is adapted for use in connection with a liquid petroleum product test which involves fluorescent indicator adsorption. It comprises in combination a means associated with the linear resistor for representing a total adsorption colum of petroleum product in terms of a resistance. It also comprises means associated with the variable taps for making connections to portions of said resistance that are directly proportional to the constituents of the adsorption column, and means associated with the means for measuring the resistance. The last named means comprises first electrical circuit means for measuring the resistance of said adsorption column representative resistor, and means for reading said resistance measurement in terms of one hundred percent. It also comprises second electrical circuit means for connecting and measuring the resistance of said constituent portions of the resistor in terms of percentage of the total resistance measurement representing the total colmun.

The foregoing and other objects of the invention will be more fully set forth below in connection with the best mode contemplated by the inventor of carrying out the invention, and in connection with which there are illustrations provided in the drawings, wherein:

FIGURE 1 is a side elevation, largely schematic in nature and illustrating the mechanical elements of the invention as applied to a particular use thereof, i.e., in making liquid-hydrocrabon-column test measurements;

FIGURE 2 is an electrical circuit diagram of the system employed in connection with the preferred embodiments of the invention;

FIGURE 3 is an enlarged perspective of the linear distance calculator, shown broken away and illustrating the mechanical elements; and FIGURE 4 is a plan view of the FIGURE 3 elements, with the top removed.

The drawings illustrate an embodiment of the invention that is adapted for use with a method of determining constituents of a liquid hydrocarbon, as mentioned above. The method relates to a standard test which entails the use of a column formed within the hollow interior of a transparent tube having an internal bore or passage with connecting capillary tubes above and below the column. This becomes an absorption column by packing silca gel therein so that a sample of the petroleum product to be tested may be introduced near the top and absorbed on the gel. This is followed by introduction of alcohol to desorb and force the sample down the column. The alcohol is driven down under gas pressure along the column where the separation is effected according to the adsorption affinities of the constituents, which then may be observed by reason of the use of fluorescent dyes which are also selectively separated with the sample fractions (constituents). Details of the standard test method are fully described, as noted above, under the ASTM designation D1319–61–T.

In FIGURE 1 there is shown one of a plurality of glass tubes 11, within which a column of finely divided silica gel 12 is placed in accordance with the above indications. The separation that is created in the column 12 will cause observable zones 13, 14 and 15 that represent the constituent fractions of the petroleum sample, i.e., the aromatics, the olefins, and the saturates respectively thereof.

It is to be noted that while only one glass tube 11 is illustrated in order to simplify the showing, the structure employed may be, as schematically indicated, such as to provide a purality of tubes located around the periphery of a rotatable rack 17. The tubes 11 are all connected to a gas manifold 18 from which the gas drive pressure may be controlled for each tube by individual valves 19, which are schematically indicated in FIGURE 1.

Rack 17 is supported on a central shaft 21 which has a foot 22 resting upon the floor or ground level. Shaft 21 is supported at the top by any feasible arrangement, such as a collar 23 with lateral support arms 24 fastened thereto.

Located under a support disc 25 (for the separation tubes 11) of the rack 17, there is a trough 28 which receives and drains off any excess sample or alcohol from the bottom of the glass tubes 11. The trough 28 is supported on legs 29 as illustrated.

A calculator according to the invention is set up beside the rack 17 so that it may act cooperatively in connection with each of the columns contained in glass tubes 11, in turn. This is done by merely rotating the rack to bring the glass tubes individually into cooperative relationship with the calculator.

The physical structure of the calculator is illustrated in FIGURES 3 and 4. It includes a linear resistor element 32. Such a resistor might take various forms, but it is preferably a resistance wire wrapped spirally around an insulating material rod 33. The rod (and resistor element) is not shown in FIGURE 1, for reasons of simplification and clarity; but it is clearly illustrated in FIGURES 3 and 4.

The length of the resistor element 32 (and its supporting rod 33) is sufficient to extend more than the maximum total distance that will be encountered along the column, when a test is being carried out. Structure for supporting rod 33 with resistor element 32 wound thereon, includes a circular base 36 and a similar circular top 37. Both base and top are preferably constructed of electrically insulating material in order to electrically isolate the upper and lower ends of the resistor 32. Both base 36 and top 37 have a socket 38 that is centrally located in each. These sockets hold the rod 33 therebetween.

Holding the base 36 and top 37 together, there are four rods 40, 41, 42, and 43. These rods are rectangular in cross section and are spaced evenly around the base and top, near the edges of each. They may be attached to the base 36 in any feasible manner (not shown) such as by having the ends of the rods round for a distance less than the thickness of the base 36. Then there will be combined square and round holes in the base to receive the rods and keep them form rotating about their longitudinal axes. Similarly the rods are fastened securely to the top disc 37 by having the ends made circular in cross section and threaded far enough so as to receive a nut 46 on the threaded end of each, as illustrated in FIGURE 3.

The whole calculator unit (including base 36 and top 37 plus interconnecting rods 40–43) is mounted by means of any convenient structure so as to be located adjacent any selected one of the tubes 11. Such mounting is schematically illustrated as a support 47 which extends up from the floor or ground level (indicated) far enough to place the calculator unit beside the tube within which a test is to be measured. It may be noted that the rack 17 is rotatable in order to bring any of the tubes 11 adjacent to the pointers of the calculator unit.

There are four pointers 50, 51, 52, and 53 that are attached to movable blocks 56, 57, 58, and 59 respectively. These blocks all slide vertically up and down the respective rods 40–43 that they ride upon. These pointers are constructed so that all of them extend out laterally into vertically alignment for location close to the glass tube 11 that is adjacent thereto. Consequently, the pointers may be adjusted for pointing at the border line between the different constituents, or at the upper or lower edge of the top of bottom constituents respectively.

Each of the blocks 56–59 has a radially oriented short rod 62, 63, 64, and 65 respectively, mounted thereon. These rods each support a rounded contactor element 68, 69, 70 and 71 respectively, with an internal spring bias arrangement (not shown) for each, in order to obtain good frictional (low electrical resistance) contact between the contactor surface and the turns of the resistor elements 32.

The foregoing comprise the principal mechanical elements of the calculator as adapted for the preferred embodiment described herein. The electrical elements may take any feasible form and are only illustrated schematically in the circuit diagram, with the exception of the resistor element 32 and contactors 68–71.

There are separate circuits provided with respect to each of the contactors as will appear below in connection with the description of the FIGURE 2 diagram. This may be carried out in any feasible manner, e.g., by having the rods 40 through 43 made of electrically conducting material such as brass, or bronze or aluminum or the like and by having the blocks 56 through 59, similarly, constructed of low resistance metal. There is preferably a spring arrangement (not shown) between the blocks and the rods upon which they slide, for maintaining good low resistance electrical contact therebetween. Also, of course, the short support rods 62–65 and elements cooperating with the contactors 68–71 will be constructed of good low resistance electrical conducting materials so that each circuit may be completed from the contactor over supporting elements and along the square rod in each case, to an electrical connection (not shown) which might be completed either at the base 36 or at the top 37. However, in either case there will be wires (not shown) or the like to make circuit connections since both top 37 and base 36 are constructed of an electrically insulating material.

It may be noted that, while separate electrical circuit connections will be made for each of the sliding contactors associated with the pointers, no such separate circuit is provided for the ends of the resistor elements 32. It stands free, so as to speak, as a linear resistor which has adequate length to extend well beyond the maximum expected total distance covered by the constituent elements of the sample that is having its constituents separated out and observed along the column 12 during a test procedure.

FIGURE 2 illustrtaes the circuit diagram of an electrical circuit arrangement that is employed. It will be observed that there is the resistor element 32 (described above) which has the contactors 68–71 making electrical sliding contact therewith. One electrical circuit consists of a source of E.M.F., such as a battery 74 that is connected directly to contactor 71 from one terminal, by a wire 75. The other terminal of battery 74 is connected directly to contactor 68 by a wire 76 that leads from the contactor 68 to one end of a variable resistor 77 which in turn is connected in series with another variable resistor 78 via a wire 82. Resistor 78 has the other end thereof connected to the battery 74 via an electrical connection, or wire 81.

The foregoing circuit provides an adjustable loop for causing current to flow from the battery over the length of the resistor element 32 that is connected between the end contactors 68 and 71. Thus the battery will cause current flow which may be adjusted to provide a desired amount of current in accordance with the requirements that will be more fully explained below.

There is a meter 85 that has a damping resistor 86 connected in shunt therewith and a protective resistor 87 connected in series. The meter is connected between a pair of movable contacts 90 and 91 of two four-position switches 92 and 93 which may be ganged together for simultaneous actuation if desired. Consequently the meter 85 may be connected selectively to four different circuits, all in relation to the resistor element 32.

In the position illustrated in FIGURE 2 the meter is connected between the contactors 68 and 71 so that it is across the maximum resistor length, which is proportional to the linear distance that is occupied by the sum of the constituents of the liquid petroleum product being tested. Thus, this circuit may be traced commencing at sliding contactor 68 and the wire 76 connected thereto. There is a wire 94 that connects to wire 76 and another wire 95 leading from the wire 94 to a stationary contact 96 of the swich 92. At the other side of the meter 85 there is a wire 99 that connects a stationary contact 100, of switch 93, to the wire 75 that is connected to contactor 71.

When the meter is connected to the next position for switches 92 and 93, it is then connected across that portion of the resistance element 32 that is located between contactor 68 and contactor 70. This connection is completed over the wire 76 from contactor 68, and over the wire 94 to a stationary contact 102 for connecting one side of the meter 85 thereto. The other side of the meter will be connected via the movable contact arm 91 of switch 93 to a stationary contact 104 that has a wire 105 connected thereto. Wire 105 leads to another wire 106 that is in turn connected to the contactor 70. Similarly the meter 85 may be connected (by moving the switch arms 90 and 91) to the succeeding positions of the switches 92 and 93.

In the next of these succeeding positions, the switch arms 90 and 91 will complete a circuit with a stationary contact 109 and another contact 110, respectively. In this switch position, the meter 85 will be connected between the contactor 70 and the contactor 69. The circuit for this connection of the meter will be clear in light of the above description relating to the circuits for connecting it between contactor pairs 68, 71 and 68, 70.

The last of the succesive positions of switches 92 and 93 will connect the meter 85 between contactor 69 and contactor 71 because the switch arms 90 and 91 will be contacting stationary contacts 113 and 114 respectively. This circuit may be readily traced in the same manner as in the case of the other positions of switches 92 and 93.

It will be observed that by having the above described circuit connections, the arrangement is such as to permit the meter 85 to be first connected across the maximum distance along resistance element 32, i.e., between the end contactors 68 and 71. This will be done following the adjustment of the pointers 50–53 to coincide with the edges of the constituents of the sample, as described above. With the meter thus connected, it will then be adjusted (by means of adjustable resistors 77 and 78) to provide a full scale reading on the meter which is calibrated to one hundred units. This reading then represents one hundred percent, i.e., the total of the linear distances covered by all of the constituents of the liquid petroleum product sample same under test. Thereafter the connections to the meter may be switched so that the meter will read directly in terms of a fraction of one hundred percent, the ratio of the linear distance covered by each of the three constituents to the total linear distance of the entire sample; and much time is saved and possible error avoided.

OPERATION

The operation of a calculator according to this invention, will be described in connection with a single measurement as it is carried out with relation to one test procedure in a single one of the glass tubes 11. However, it will be appreciated that the process is repeatable, and with the illustrated arrangement a substantial number of individual petroleum product tests may be calculated in rapid succession by merely rotating the rack 17 so that each of the plurality of glass tubes 11 (one for each petroleum product sample under test) will come into an association with the pointers of the analog calculator structure according to the invention.

After a petroleum product under test has been introduced and has separated into constituent zones, in accordance with the above described standard test procedure, the four pointers 50–53 will be positioned opposite the boundaries of the three constituents that go to make up the total sample under test. Then with the pointers in these positions, the meter 85 will be connected across the entire length of resistor element 32 that is located between the uppermost and lowermost contactors 68 and 71. This is accomplished by setting the switches 92 and 93 to what may be termed the number one position, i.e., that illustrated in FIGURE 2. While the meter 85 is thus connected, the variable resistors 77 and 78 will be adjusted to regulate the current flow through resistor element 32 until the meter 85 reads full scale, i.e., one hundred units. This setting will then represent one hundred percent of the sample column. In other words the meter reading is proportional to the linear distance covered by the total sample column as determined by the setting of the two end pointers 50 and 53, or the total of all three constituents. This total linear distance is equal or proportional to the distance between the contactors 68 and 71.

Next, it is merely necessary to switch connections of the meter 85 successively to each of the other three positions of the switches 92 and 93, which may be termed the No. 2, 3 and 4 positions of contact arms 90 and 91. In this manner the meter is in turn connected between contactors 68 and 70, 70 and 69, and 69 and 71. Thus, the meter 85 will read immediately the exact figure in terms of percentage which the individual distances represent, as related to the total distance, i.e., that between the extreme top and bottom contactors 68 and 71.

Heretofore, each sample test measurement would involve four linear distance measurements (or three plus a summation thereof) followed by three separate calculations based on the measurements, in order to arrive at the desired ratios expresed as percentages. Thus, it will be observed that by use of an analog calcluator according to this invention, much time is saved. Also a likely source of possible error is completely eliminated. Both of these are accomplished by the relatively simple expediency of an analog calculator having structure in accordance with the invention.

It may be observed that in connection with the preferred embodiment according to this invention, i.e., that described above, the following circuit constants were employed for the various elements involved in the electrical circuit illustrated. Battery 74 is a twenty-four volt DC battery; resistor 78 is a three hundred-ohm variable; resistor 77 is a one thousand-ohm variable; protective resistor 87 is a one hundred kilo-ohm resistor; and damping resistor 86 is a five hundred-ohm resistor. The meter 85 is a microammeter calibrated for zero to one hundred micro amperes, and preferably has an accuracy of one-half of one percent. The resistance element 32 is con structed of turns of Nichrome wire No. 30 B&S gauge (0.010 inch in diameter), and it is wound around the rod 33 which has an insulating material tube (not shown) on the exterior surface of a metal rod. The tube is seven-eights inch outside diameter and is provided with grooves having a pitch such that there are twenty-four turns per inch of the Nichrome wire that is wound thereon.

While a preferred embodiment of the invention has been described above in considerable detail in accordance with the applicable statutes, this is not to be taken as in any way limiting the invention, but merely as being descriptive thereof.

What is claimed is:

1. An analog calculator for directly reading partial linear measurements as a percentage of a predetermined total linear distance, comprising in combination
    a linear resistor having an effective length proportional to at least said predetermined total linear distance,
    a plurality of variable taps independently settable relative to each other and to said linear resistor including extreme end taps for making electrical connections with said linear resistor therealong,
    means for connecting said taps at points along said resistor spaced proportionally to said linear measurements, and
    means for measuring the resistance between predetermined pairs of said taps as a percentage of the resistance between the extreme end taps.

2. An analog calculator according to claim 1 wherein said resistance measuring means comprises
    a source of electromotive force,
    a voltmeter, and
    circuit means for selectively connecting said voltmeter between pairs of said taps including said extreme end taps.

3. An analog calculator according to claim 2 wherein said source of electromotive force is variable, and
    wherein said circuit means includes a switch for alternatively connecting the voltmeter between the said extreme end taps or between adjacent pairs of said taps from one end to the other,
    whereby said voltmeter may be adjusted to read one hundred percent when connected between the extreme end taps and will then read directly the linear measurements represented by the spacing between adjacent pairs of said taps in terms of percentage of the linear measurement represented by the total spacing between said extreme end taps.

4. An analog calculator adapted for use in connection with a liquid petroleum product test involving a fluorescent indicator adsorption column having a plurality of constituents making up a total length of said adsorption column, comprising in combination
    a linear resistor having an effective length proportional to at least said total length of said adsorption column,
    a plurality of variable taps independently settable relative to each other and to said linear resistor including extreme end taps for making electrical connections with said linear resistor therealong,
    means associated with said linear resistor including said extreme end taps for proportionally representing said total length of said adsorption column as part of said linear resistor,
    means associated with said variable taps for proportionally representing the lengths of said constituents of said adsorption column as parts of said linear resistor, and
    means for measuring the resistance between predetermined pairs of said taps as a percentage of the resistance between said extreme end taps.

5. An analog calculator according to claim 4 wherein said means for measuring the resistance comprises
    a source of electromotive force,
    a meter, and
    circuit means for selectively connecting said meter between pairs of said taps including said extreme end taps.

6. An analog calculator according to claim 5 wherein said source of electromotive force is variable, and
    wherein said circuit means includes switch means for alternatively connecting said meter between said extreme end taps or between adjacent pairs of said taps from one end to the other,
    whereby said meter may be adjusted to read one hundred percent when connected between the said extreme end taps and will then read directly the percentage measurements of said constituents lengths related to the total length of said adsorption column.

7. An analog calculator according to claim 6 wherein said means associated with said linear resistor includes a pair of pointers connected to said extreme end taps, and
    said means associated with said variable taps includes pointers connected to the remaining ones of said variable taps.

References Cited

UNITED STATES PATENTS

| | | | |
|---|---|---|---|
| 2,803,799 | 8/1957 | Siegel et al. | 324—63 |
| 3,063,637 | 11/1962 | Burhans | 235—151.35 X |
| 3,108,929 | 10/1963 | Tolin et al. | 235—151.35 X |
| 3,245,304 | 4/1966 | Davis. | |

MALCOLM A. MORRISON, Primary Examiner

JOSEPH F. RUGGIERO, Assistant Examiner

U.S. Cl. X.R.

235—193